United States Patent [19]

Hiestand

[11] 4,387,907
[45] Jun. 14, 1983

[54] DEVICE FOR CONTROLLING A WORKING MACHINE

[75] Inventor: Karl Hiestand, Pfullendorf, Fed. Rep. of Germany

[73] Assignee: SMW Schneider & Weisshaupt GmbH, Fed. Rep. of Germany

[21] Appl. No.: 159,384

[22] Filed: Jun. 13, 1980

[30] Foreign Application Priority Data

Jun. 15, 1979 [DE] Fed. Rep. of Germany ....... 2924111

[51] Int. Cl.³ .......................... B23B 31/28; B23B 31/30
[52] U.S. Cl. ....................................... 279/4; 82/40 R; 92/5 R; 279/111; 409/232
[58] Field of Search .................. 279/4, 2 R, 2 A, 1 H, 279/1 ME, 110, 111, 121; 409/230, 231, 232, 233, 234; 91/1, 433; 92/5 R; 82/40 R

[56] References Cited

U.S. PATENT DOCUMENTS

3,986,437 10/1976 Lioux .................................... 92/5 R
4,207,564 6/1980 Isakson et al. .................... 92/5 R X Primary Examiner—Z. R. Bilinsky
Attorney, Agent, or Firm—McGlew and Tuttle

[57] ABSTRACT

An improved device for controlling a working machine of the type having a chuck body including a rotary chuck cylinder closed by a cylinder cover to define a substantially closed pressure space and a chuck piston slidably disposed in the pressure space for displacement responsive to a fluid pressure, includes, a pulse generator member axially guided within the chuck body in communication with the pressure space for movement responsive to one of the fluid pressure at a predetermined level and the position of the chuck piston at a predetermined position, or both. A switch is provided outside of the chuck body at a spaced location therefrom for switching the machine off. A control member is displaceably mounted in the chuck body operative to interconnect the pulse generator member responsive to movement of the pulse generator member.

11 Claims, 10 Drawing Figures

DEVICE FOR CONTROLLING A WORKING MACHINE

FIELD AND BACKGROUND OF THE INVENTION

This invention relates, in general, to a chuck or rotating vise which may be attached to a spindle of a machine and, more particularly, to a new and useful arrangement for controlling a working machine responsive to the pressure or the position of the piston, or both, in a rotary chuck cylinder.

In known machine tools equipped with tie-rod chucks, the pressure in the chuck cylinder, mounted behind the spindle head or headstock, is monitored to instantly and automatically stop the machine in order to prevent accidents. In such an arrangement, the distributors of the chuck cylinders do not rotate but are stationary and permanently connected through pressure lines, to a pressure fluid supply. This can be simply effected by means of pressure switches provided in the pressure lines which deliver a pulse for stopping the operation of the working machine as soon as a predetermined minimum pressure is reached.

In rotary chuck cylinders, particularly collet chucks, where the pressure is confined inside and the pressure fluid supply lines are interrupted during operation of the machine so that the communication to the cylinder is not permanent, such pressure checking is not possible. Until now, such chucking devices did not permit the machine to automatically be stopped in the event that an insufficient clamping force was caused by a pressure drop in the pressure space of the machine chuck cylinder.

SUMMARY OF THE INVENTION

The present invention is directed to a device for controlling a working machine, which permits the monitoring of the pressure or the position, or both, of the chuck piston, even in a rotary chuck cylinder, in a simple manner and which allows automatic stopping of the machine as a function of this pressure or upon an unsatisfactory engagement between the members of the transmission chain. The construction is inexpensive, but permits a very reliable control so as to prevent both damage to the workpieces and accidents.

It is an object of the invention to provide in combination with a working machine of the type having a chuck body including a rotary chuck cylinder closed by a cylinder cover to define a substantially closed pressure space and a chuck piston slidably disposed in the pressure space for displacement responsive to a fluid pressure in the pressure space, a source of fluid under pressure, and means for providing fluid communication between the source and the pressure space, an improved device for controlling the working machine. The improved device includes a pulse generator member axially guided within the chuck body in communication with the pressure space for movement responsive to one of the fluid pressure at a predetermined level of pressure and the position of the chuck piston at a predetermined position, or both, and axially displaceable into an end position.

In addition, the device includes switching means provided outside of the chuck body at a spaced location therefrom for switching the machine off and a control member, displaceably mounted in the chuck body, operative to interconnect the pulse generator member and the control member, whereby, the control member is displaceable upon movement of the pulse generator member into the end position to actuate the switching means to switch off the machine.

In one embodiment of the invention, the pulse generator is designed as a piston or double piston which can be loaded, directly or indirectly, through intermediate members and on one or both sides, by the pressure fluid present in the pressure space to be monitored, and which is displaceable against the force of springs and is connected to a control member. Advantageously, in this design, the pulse generator is accommodated in a recess of the cylinder cover which is designed as a pressure space extending parallel or perpendicularly to the axis of the cylinder.

With the piston of the pulse generator extended in the axial direction, it is preferred to associate it with a radially extending control member designed as a pin which is guided in a recess of the cylinder or the cylinder cover and is operatively connected to the piston through oblique surfaces or teeth which are formed on the piston and inclined in the direction of the displacement thereof, or through levers engaging the cooperating parts, or through a gear portion meshing with a tooth portion of the piston and guided for axial displacement by means of a stud or the like, to change the direction of motion from the axial direction. However, the piston may also be provided, on its side remote from the pressure space, with an extension projecting from the cylinder cover and also serving as a control member.

To insure a permanent and completely satisfactory holding of the workpiece in the gripping jaws, independently of the pressure in the chuck cylinder, a development of the invention provides that the end positions of the chuck piston inserted in the chuck cylinder be monitored. The piston of the pulse generator is connected to an extension projecting into the cylinder or, with the piston extending perpendicularly to the axis, associated with an actuable cam element which is operatively connected thereto through oblique surfaces or the like, by which the pulse generator can be actuated in one or both of the directions of displacement of the piston in the respective position thereof, directly or by means of stops provided on the extension. This makes it possible to check the end positions of the chuck piston in a relatively simple manner.

In accordance with another embodiment of the invention, the pulse generator is designed as a diaphragm which can be loaded by the pressure fluid in the pressure space to be monitored and flexed against the force of springs and which cooperates with a control member in the form of a bolt or the like inserted into the chuck cylinder, preferably in the cylinder cover.

In this arrangement, if the pulse generator is used in connection with a double-acting chuck cylinder, it is advisable to associate it with a slide valve which is mounted upstream and which can be loaded by the pressure fluid from both sides and through which the pressure space adjacent to the diaphragm is automatically connectable to the respective pressure space of the chuck cylinder to be monitored.

A particularly advantageous design includes two telescoping pistons which can be loaded by the pressure fluid from both sides thereof and which are coupled to each other through a friction member. The distance of displacement and the surface areas loadable by the pressure fluid of one of the pistons which is displaceable against the force of springs is larger than the distance of displacement in the surface areas loadable by the pressure fluid of the other piston. The piston with the smaller distance of displacement cooperates with a control member of the pulse generator. This enables the pulse generator to produce a control signal already at a predetermined pressure drop, and only upon reaching a definite minimum pressure.

In accordance with still another embodiment of the invention, the pulse generator may comprise one or several strain gauges, piezoresistance elements, Hall Ics, or the like, carried on a support, for example, a diaphragm, which can be acted upon by the pressure fluid directly through an intermediate member.

The switching element receiving the control pulses from the pulse generator is designed to be actuable by a change in position of the control member of the pulse generator. This may be accomplished in a manner such that a non-contact switch, desgined as a probe, is provided as the switching element, by which, depending on the position of the control member, a current pulse is delivered to the machine control or to an indicator.

It is also possible, however, to provide that a mechanically actuable switch is used as the switching element in which a contact bridge piece can be actuated by a pushbutton or the like cooperating with the control member of the pulse generator, for example, through oblique surfaces.

It is also possible to provide a switch actuable by a current pulse which may be produced by the pulse generator, or an induction coil, or a fixed photocell acted upon by a luminous source incorporated in the chuck cylinder.

The inventive device in any of its embodiments is not only very simple in construction, and thus economical to manufacture, but the device is also very reliable in operation and is hardly susceptible to disturbances. Thus, if the pressure space or chuck piston to be monitored is associated with a pulse generator which can be moved against an adjustable predetermined force or actuated in predetermined positions of the chuck piston, or both, and cooperates with a switching element disposed outside of the chuck cylinder, simple means are provided for controlling the working machine. Upon a pressure drop to a definite level or at definite differential pressure or a definite position of the chuck piston, the machine can be automatically stopped as soon as there is no longer a sufficient clamping pressure, or a secure engagement of the transmission members would no longer be ensured. In this way, accidents and damages are reliably prevented.

The pulse generator also permits an easy check of the end position of the chuck piston, so that a satisfactory engagement, for example, of the teeth of the wedge bar and the master jaws is also ensured. Furthermore, since only a few component parts are needed for the inventive device, which can easily be incorporated in a chuck cylinder or a collet chuck, the susceptibility to disturbances is small and the reliability in operation is high.

For an understanding of the principles of the invention, reference is made to the following description of typical embodiments thereof as illustrated in the accompanying drawings.

DESCRIPTION OF THE PREFERRED EMBODIMENT

Referring now to the drawings, in particular, the invention embodied therein, comprises, a power chuck, generally designated 1, mounted on a working machine. The chuck 1 comprises a chuck body including a chuck cylinder 2 which is closed by a cover 3 to define a substantially closed pressure space or spaces 5, 6, and a chuck piston 4 which is received within and is slidably disposed in the pressure spaces 5, 6 in the cylinder and is displaceable therein by a pressure fluid and is positively connected to the clamping jaws (not shown). The pressure fluid is supplied from a source of fluid under pressure (not shown) to pressure spaces 5 and 6 through lines which are not in fluid communication with the chuck during operation. Pulse generators, which may have a variety of designs, are provided for monitoring the pressures in pressure space 5 or 6, or both, and are connected to the pressure spaces 5 and 6 directly or through a pressure fluid passage 7.

Figure 1:
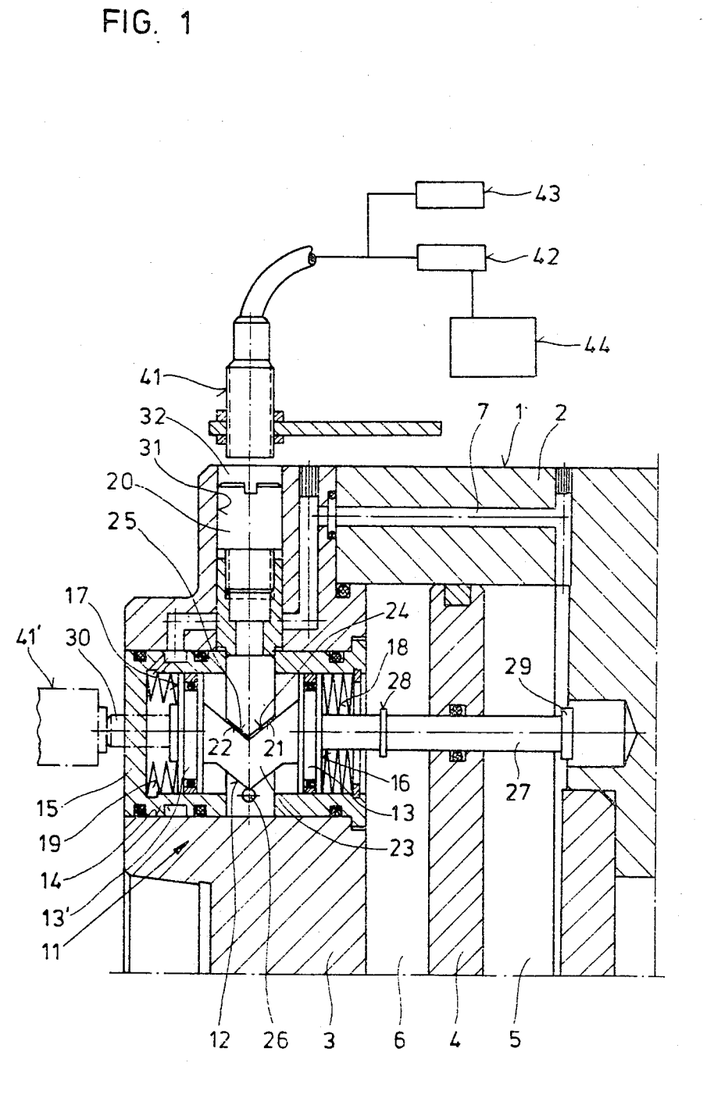
FIG. 1 illustrates a control device, according to the invention, incorporated in a chuck of a working machine, comprising, a sectional view of a pulse generator in the form of a piston which is loadable from both sides and is operatively connected, through oblique surfaces, to a control member which cooperates with a switching element or member provided outside of the chuck cylinder.

The inventive device, generally designated by reference numeral 11 in FIG. 1 is intended for controlling the working machine in dependence on or as a function of the pressures present in pressure spaces 5, 6. The inventive device 11 substantially comprises a pulse generator 12 which is received in the cylinder cover 3, a radially displaceable control member 20 operatively connected thereto, and a switching element 41 which is provided outside of the chuck 1, at a spaced location therefrom, to receive or produce a control signal and transmit it through a relay 42 to the machine control mechanism 44 or to an indicator 43, or to both. Pulse generator 12, in the embodiment of FIG. 1, is characterized by a piston means having a double piston 13, 13', which is slidably guided for displacement in a bushing 15 inserted in a recess 14 formed in the cylinder cover 3. The pulse generator is in fluid communication with, and is loaded by, the pressure fluid supplied to pressure spaces 5, 6.

To divert the motion of displacement of double piston 13, 13', oblique surfaces 24, 25, inclined toward each other, are provided on a web plate 23 which interconnects the two piston portions proper. The oblique surfaces 24, 25 cooperate with oblique surfaces 21, 22 formed on control member 20. The retraction of control member 20 is effected by means of a stud 26.

Double piston 13, 13' is held in an equilibrium or a mid-position by cup springs 18, 19 and is displaceable in both directions against the force of these springs. Consequently, upon loading piston surface 16, the force of springs 19, against the opposite piston surface 17, must be overcome, and upon loading piston surface 17, spring 18 must be compressed. Springs 18, 19 are dimensioned to automatically return the double piston 13, 13' into its illustrated position when a defined minimum pressure is present in pressure spaces 5, 6.

If, for example, pressure fluid is supplied into pressure space 5 at a pressure of ten bar, chuck piston 4 is displaced to the lefthand side and the gripping jaws (not shown) are pressed against a workpiece clamped therein with a force corresponding to that pressure. The pressure in pressure space 5 further acts through passage 7 on piston surface 17 so that double piston 13, 13' is displaced to the righthand side, against the force of cup springs 18 which are dimensioned to counter-balance a pressure of only two bar. At the same time, control member 20 is moved by oblique surfaces 22, 25 radially outwardly into a position flush with the outer surface of chuck cylinder 2. In this position, no control pulse is generated in switching member 41, which may be designed as an armature turn, since the pressure in pressure space 5 corresponds to the desired pressure.

However, as soon as the pressure in pressure space 5 dissipates, for example, due to leakage, or for other reasons, the force of compressed spring 18 no longer balances the pressure acting on piston surface 17 and piston 13, 13' is returned to its illustrated position. This means that control member 20, which is guided in a radial bore 31, is retracted, by means of a stud 26 cooperating with the web plate 23, and a recess in the shape of a blind hole 32 is formed in the outer surface of chuck 1. With control member 20 in this position, and due to recess 32, the current flow in switching element 41 is changed at every revolution of chuck 1 as the recess moves past element 41, so that a control signal is delivered through relay 42, to switch off the working machine. Switching element 41 is thus responsive to a changing position of control member 20 without being directly actuated by, or connected to this member.

To prevent chuck piston 4 from moving into an end position in which a satisfactory engagement of the cooperating teeth and straining of the jaws could no longer be ensured, two stops 28, 29 are provided on the extended piston rod 27 of double piston 13, 13'. Due to these stops, double piston 13, 13' is returned to its illustrated mid-position as soon as the end positions determined by the stops 28, 29 are exceeded, independently of pressures in pressure spaces 5, 6, so that, thereby, a control signal is again generated to switch-off the working machine.

It is also possible, of course, as shown on the lefthand side of cylinder cover 3 in dash-dotted lines, to actuate a switching element 41' mechanically. For this purpose, an extension 30 may be provided on piston 13, 13' by which, upon a displacement of the double piston caused by chuck piston 4 and through stop 28, to the lefthand side, switching element 41' is actuated. Switching element 41' may, at the same time, be used for monitoring the pressure in pressure space 5.

Figure 2:
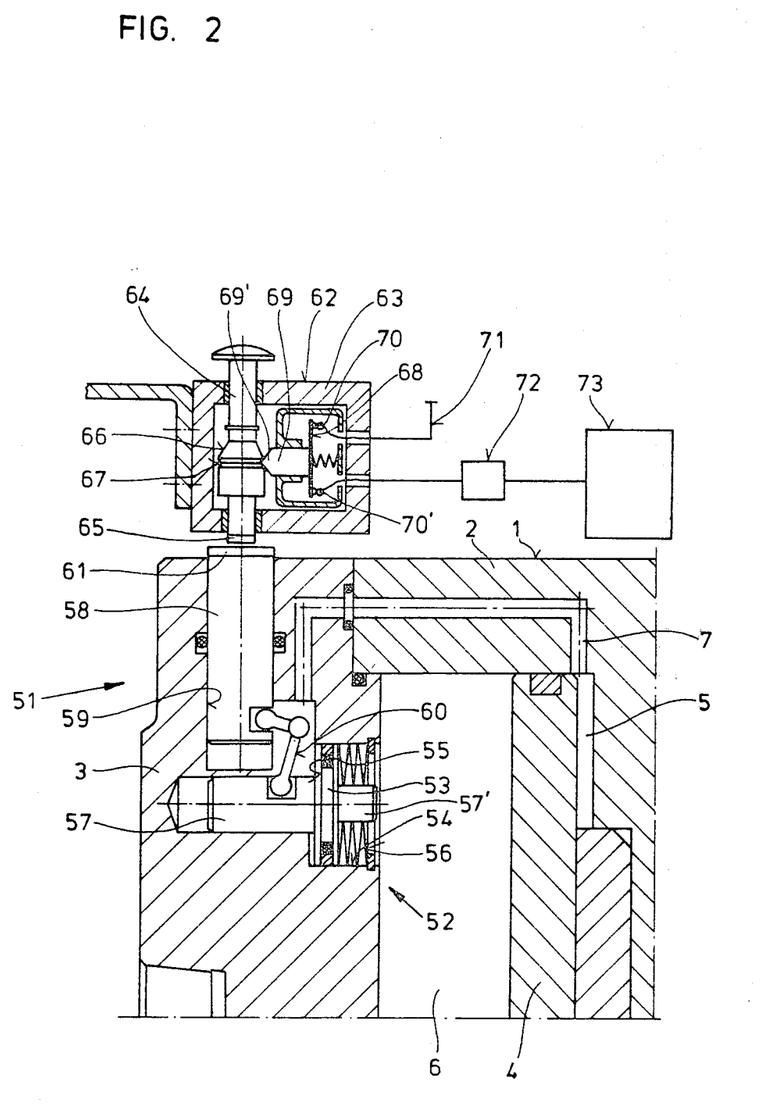
FIG. 2 is a sectional view of another design of the pulse generator and the switching element in a device according to FIG. 1.

In accordance with another embodiment of the invention, a device 51 for controlling a working machine is shown in FIG. 2. Device 51 includes a pulse generator 52 which is received in cylinder cover 3 and extends in the axial direction of chuck piston 4, a control member 58 inserted in a radial bore 59, and a switching element 62 acting on a machine control 73 through a relay 72. Pulse generator 52 serves the purpose of monitoring the pressure in pressure space 5 of chuck 1 and is designed as a piston 53 which is slidably received in a recess 54 of cylinder cover 3 and displaceable against the force of cup springs 56. Piston 53 is operatively and positively connected to control member 58 through a pivotally mounted elbow lever 60 engaging a recess provided in an extension 57 of the piston.

To actuate a switching element 62, designed as a switch, control member 58 is formed, on its outer end, with an oblique surface 61, and switching element 62 is equipped with a switching member 64 which is displaceable in a casing 63 and provided with a mating surface 65 opposite to surface 61 for mating therewith. Further provided in casing 63 is a contact-bridge piece 68 for actuating contacts 70, 70' which are connected in a circuit 71. To this end, contact-bridge piece 68 is provided with a pin 69 whose pointed end 69' cooperates with an oblique surface 66 and a stop groove 67 of switching member 64.

As soon as piston surface 55 of piston 53 is loaded by the pressure fluid from pressure space 5 through passage 7, piston 53 is displaced to the righthand side, provided that the force exerted thereon is stronger than the biasing of springs 56. At the same time, control member 58 is retracted by elbow lever 60 from its shown position inwardly, so that oblique surface 61 comes to be flush with the outer surface of chuck 1.

However, if the pressure in pressure space 5 drops below a minimum which can no longer balance the force of compressed springs 56, piston 53 is moved by the springs to the lefthand side. Control member 58 is thereby pushed outwardly of the chuck so that oblique surface 61, as it moves past fixed switch 62, is pressed against oblique surface 65 of switching member 64. Switching member 64 is thereby pushed upwardly and oblique surface 66 causes contact-bridge piece 68 to apply against contacts 70, 70', so that circuit 71 is closed and the working machine is switched off. This position is shown in FIG. 2. In this position, pin 69 is engaged at its pointed end 69' in stop groove 67 and the working machine may be restarted only upon remedying the disturbance or by unlocking switching element 62.

To check the end position of chuck piston 4, piston 53 of pulse generator 52 may be formed with an extension 57' projecting into pressure space 6. Then, if chuck piston 4 is moved beyond the range limited by extension 57', the working machine is switched off again independently of the pressure in pressure space 5, since piston 53 is engaged or pushed to the lefthand side.

Figure 3:
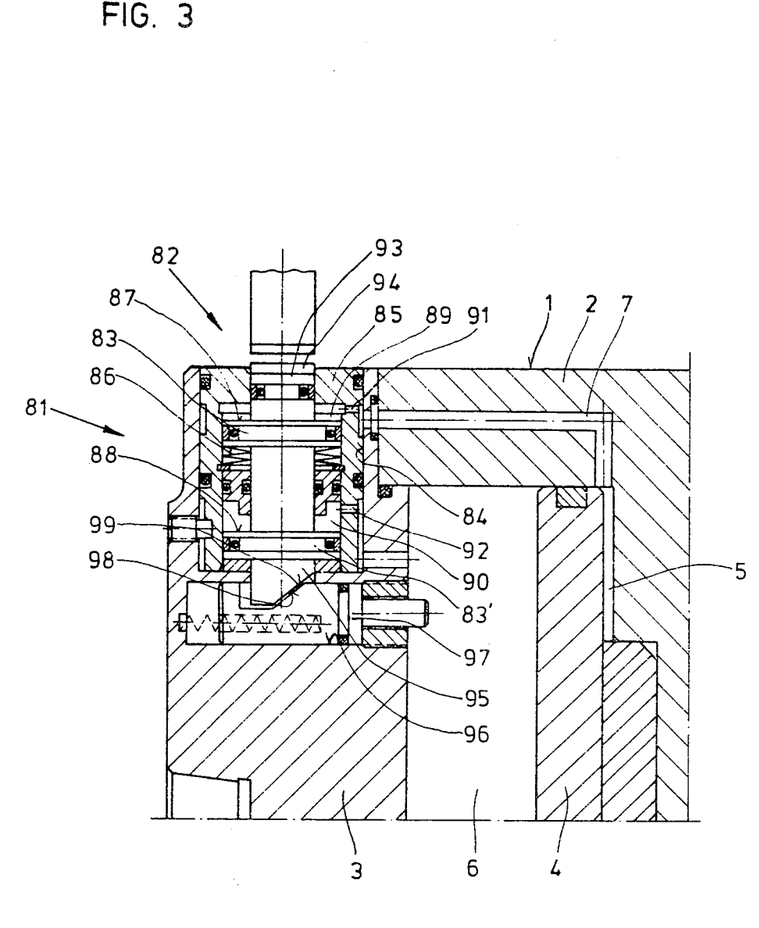
FIGS. 3 and 4 illustrate sectional views of further embodiments of a pulse generator inserted in the chuck cylinder.

In a control device 81 illustrated in the embodiment of FIG. 3, a pulse generator 82 is designed as a double piston 83, 83' which is mounted in a bushing 85 inserted in a recess 84 of cylinder cover 3, for radial displacement against the force of springs 86. In this design, piston 83, 83' and bushing 85 enclose pressure spaces 89, 90 to which the pressure fluid is supplied from pressure spaces 5, 6 of chuck 1, through passages 7 and 91, 92.

Upon loading one of piston surfaces 87, 88 with a fluid pressure which overcomes the biasing force of cup springs 86, piston 83 is displaced inwardly. In this position, an extension 93 formed on piston 83 and effective as a control member is flush with the outer surface of chuck 1 so that no switching member is actuated by the rotating chuck. However, as soon as the pressure in the respective supply pressure space 5, 6 drops to a minimum, piston 83 is displaced by the force of springs 86 radially outwardly, and a switching element is actuated by an oblique surface 94 provided on extension 93 in the same way as in the embodiment of FIG. 2.

In addition, piston 83 is provided on its inwardly turned end with another extension 95 which cooperates through an oblique surface 99 thereof and an oblique surface 98 of a switching pin 97 slidably received in a recess 96 of cylinder cover 3. If chuck piston 4 is displaced beyond the clamping range permitted by switching pin 97, extension 93 of piston 83, 83' is moved, independently of the pressure in pressure space 5, into a position in which a switching element is actuated and the working machine is automatically switched off.

Figure 4:
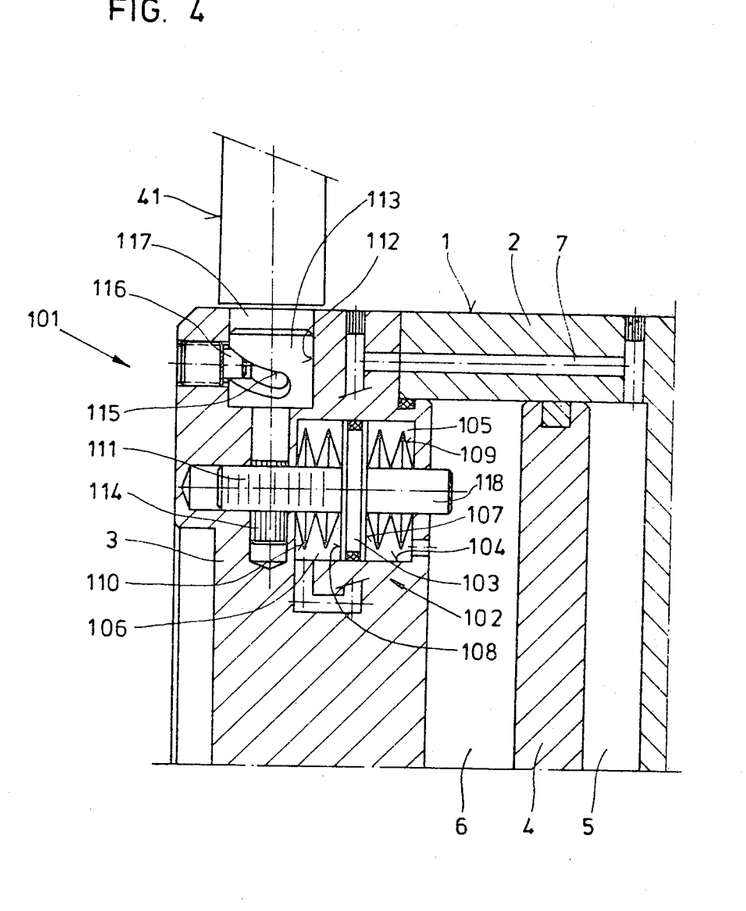

In the embodiment of a control device 101 according to the invention, shown in FIG. 4, the pulse generator 102 is again designed as a double-acting piston 103 which is displaceable against the force of springs 109, 110 in the axial direction of chuck piston 4 and is slidably received in a recess 104 of cylinder cover 3. In order to change the direction of motion relative to the axial motion of piston 103, the piston is provided with a plurality of successively spaced teeth forming a rack portion 111 cooperating with a bolt 113, which serves as the control member, which is rotatably received in a radial recess 112 of cylinder cover 3 and is provided with a corresponding plurality of circumferentially spaced splines to form a gear portion 114 which intermeshes with the rack portion 111.

If pressure fluid is supplied from pressure spaces 5, 6 of chuck 1 to one of pressure spaces 105, 106 adjacent piston 103 in permanent fluid communicating therewith, then as the piston is displaced to the right or the left, as long as the pressure exerted on piston surface 107, 108 exceeds the biasing force of the opposite springs 110, 109. Bolt 113 is thereby turned and, at the same time, displaced radially outwardly since a guide member 116 is provided which engages a helical groove 115 of the bolt. In this position, no control pulse is transmitted by switching element 41 which is designed as in the embodiment of FIG. 1.

However, if the clamping pressure in pressure spaces 5, 105, 6, 106 drops below a predetermined minimum and piston 103 is pushed back by springs 109, 110 into its illustrated mid-position, a blind hole 117 is formed on the outer surface of chuck 1 by which a current flow in switching element 41 is varied at every revolution. A control signal is thus produced without contact which causes the working machine to stop operating.

To monitor the end positions of chuck piston 4, an extension 118 projecting into pressure space 6 is provided by which pulse generator 102 is actuated, independently of the pressure in pressure space 5, as soon as chuck piston 4 is moved beyond the associated clamping region.

Figure 5:
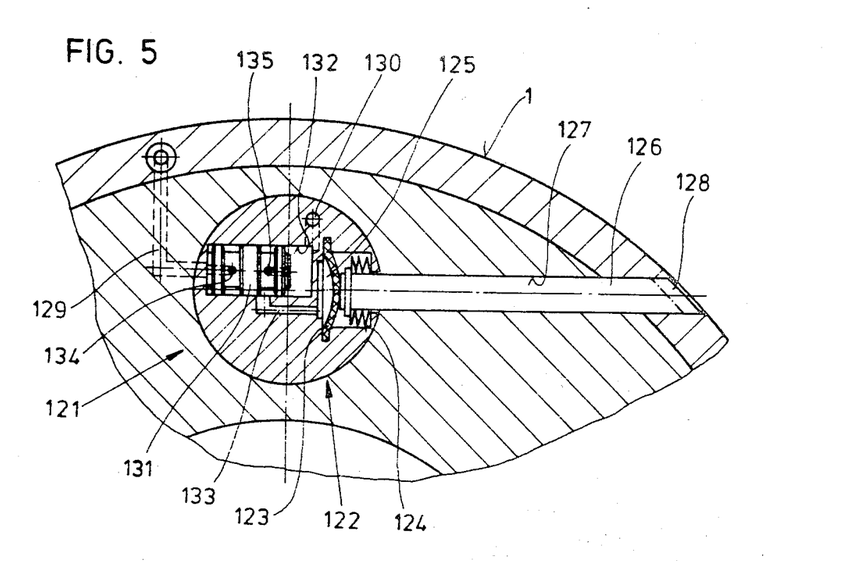
FIG. 5 illustrates a pulse generator designed as a diaphragm for a device according to FIG. 1.

FIG. 5 shows a control device 121, in loaded position, in which a diaphragm 123 to be exposed to the pressure fluid is provided as the pulse generator 122. A radially extending control member 126 which is slidably received in a recess 127 of chuck 1 and is displaceable against the force of springs 124 which tend to bias the control member 126 and the diaphragm 123 to an equilibrium position. Control member 126 cooperates with a switching element or member, such as is disclosed in connection with FIG. 1, contacts against one side of diaphragm 123. The pressure fluid is supplied from the pressure spaces of chuck 1 to a pressure space 125 associated with diaphragm 123 through passages 129, 130 and through a slide valve 131 which is received in a recess 132 upstream of the diaphragm. Since the valve is provided with ports 134, 135 through which a communication can be established between the passage 133 opening into pressure space 125 and the passage 129 or 130, depending on where the pressure is higher, diaphragm 123 can be used for monitoring both pressure spaces of chuck 1.

If the clamping pressure in the monitored pressure space of chuck 1 drops below a definite value, diaphragm 123 and control member 126 are displaced by springs 124 inwardly. Again, a blind hole 128 is formed thereby on the outer surface of chuck 1, by means of which a control signal is generated as in the embodiment of FIG. 1 and the working machine is automatically switched off.

Figure 6:
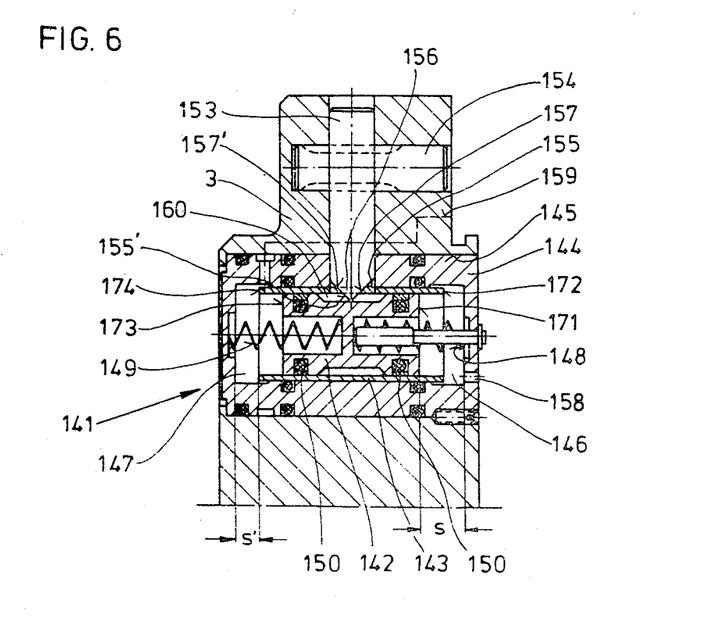
FIG. 6 shows a pulse generator formed by two telescoping pistons inserted in the cylinder cover.

The pulse generator 141, according to the embodiment illustrated in FIG. 6, comprises, two telescoping pistons 142, 143 which are displaceable in a bushing 144 received in a recess 145 of cylinder cover 3. The two pistons 142, 143 are connected to each other by friction members 150. The inner piston 142 is displaceable against the force of springs 148, 149 extending centrally within the inner piston. The piston surface areas 171, 173 of inner piston 142 are larger than the piston surface areas 172, 174 of the outer piston 143 which cooperates with a control member 151 (FIG. 7) through oblique surfaces 157, 157' forming the boundary of a recess 156. The distance of displacement (S') and the surface areas 171, 173 of the piston 142, which is displaceable against the force of springs 148, 149, is largern than displacement (S) of the surface areas 172, 174 of the outer piston 143.

Figure 7:
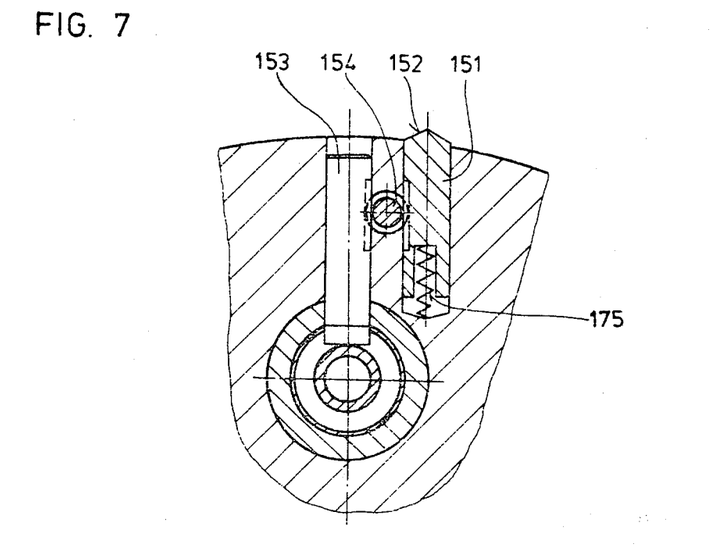
FIG. 7 shows the arrangement of an intermediate member associated with the control member in the design of FIG. 6, and intended to compensate for the centrifugal force.

As shown in FIG. 7, the radially outwardly displaceable control member 151, which cooperates through oblique surfaces 152 with a switching element, such as was disclosed in FIG. 2, is associated with an intermediate member 153 of identical mass, which applies, through oblique surfaces 155, 155', against piston 143 and engages recess 156. Through a pinion 153, a ract portion of control member 151 is positively in connection with a rack portion of intermediate member 153. In this way, centrifugal forces acting on control member 151 and intermediate member 153 neutralize each other, since they tend to rotate pinion 154 in opposite directions.

The pressure spaces 146, 147 associated with pistons 142, 143 permanently communicate through passages 158, 158' with the pressure spaces of chuck 1. Upon a pressure buildup in one of pressure spaces 146, 147, for example, in space 146, the two pistons 142, 143 are conjointly displaced to the lefthand side. During this motion, intermediate member 153, which engages by its pointed end in a recess 160 in the outer wall of the spring-loaded inner piston 142, is pushed by the oblique surface 157 of outer piston 143 outwardly, so that control member 151 is pushed by pinion 154 inwardly and its tip comes to be flush with the outer surface of cylinder cover 3. In this operating position, the outer piston 143 applies by its piston surface 174 on bushing 144, while inner piston 142 is moved farther to the left until an equilibrium is established by the force of spring 149.

If the pressure in pressure space 146 drops, for example, from twelve bar to ten bar, piston 142 is displaced by the force of spring 149 to the right, until the spring force again balances the pressure exerted on piston surface 171. Further, since the surface area of piston 143 is small and only a small force is exerted thereon, and friction members 150 connect the two pistons 142, 143, both pistons are displaced to the right. At the same time, since no force is exerted through piston 143 on intermediate member 153, control member 151 can be displaced by a return spring 175 outwardly, into the shown position, so that, in accordance with FIG. 2, a switching member may be actuated through oblique surface 152 to switch off the working machine.

It is evident that the pulse generator of FIG. 6 is not responsive to a minimum pressure in one of the pressure spaces, but is responsive to a predetermined pressure drop, for example, of two bar. The friction members 150 must be designed to produce a frictional force exceeding the force exerted on piston surface 172, 174, so as to ensure a taking along at a predetermined pressure drop. As intermediate member 153, which is urged inwardly by spring 175, engages recess 156 of piston 143 limited by oblique surfaces 157, 157', the piston is again fixed at its mid-position. As a matter of course, piston 143 must be secured against rotation in bushing 144, for example, by means of a nose formed thereon. By venting both pressure spaces 146, 147, piston 143 can also be returned into its shown initial position by springs 148, 149.

Figure 8:
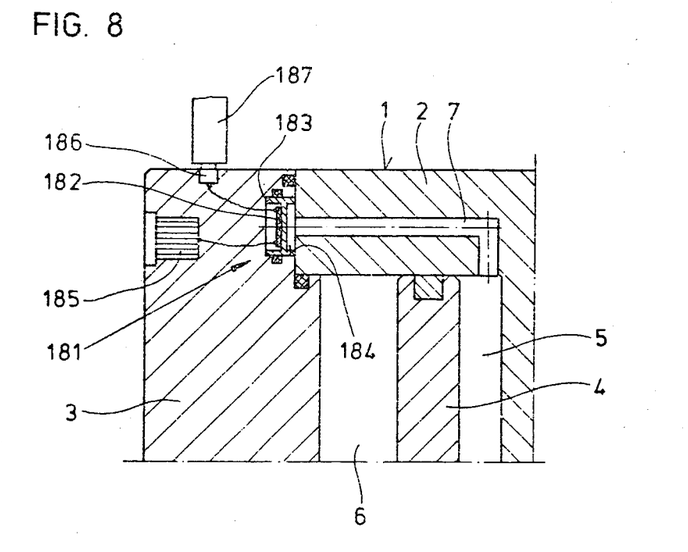
FIG. 8 shows a strain gauge serving as a pulse generator and carried on a support which is exposed to the pressure fluid supplied to the chuck cylinder.
Figure 9:
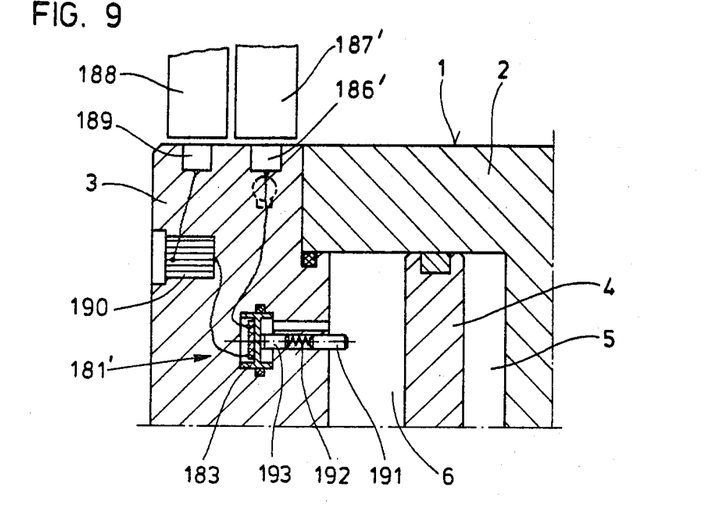
FIG. 9 shows a slight modification of the design of FIG. 8 in which the end position of the chuck piston is checked.

In the embodiments of FIGS. 8 and 9, a strain gauge 182 is provided as the control member 181, 181' which is carried on a deformable support 183. In the design of FIG. 8, the recess 184 in which support 181 is received, is connected to pressure space 5 of chuck 1, while in the design of FIG. 9, the recess is connected to pressure space 6. Further, the supply of strain gauge 182 is different, in one of the designs by means of a battery 185 directly inserted in the cylinder cover 3, in the other design by means of an induced current transmitted by induction coils 188, 189 and through a rectifier 190.

As soon as support 183 is exposed to the fluid pressure, the resistance of gauge 182 varies in accordance with the varying length of the support. The voltage variation is a measure of the instantaneous pressure in pressure space 5, 6. The current flowing through strain gauge 182 is collected by means of a collecting ring 186 and a sliding contact 187 and the machine is switched off at a predetermined differential pressure of a minimum pressure.

To monitor the end positions of chuck piston 4, the design in accordance with FIG. 9, provides a switching member 191 acting on support 183 through a spring 192 and a stem 193. If chuck piston 4 is then displaced beyond the limit given by switching member 191, spring 192 is compressed in this embodiment and a higher pressure is exerted on support 183 again, leading to stopping of the machine. The voltage variations may also be transmitted by means of a luminous strip 186' inserted in cylinder cover 3 and connected to pulse generator 181', and a cooperating photocell 187'.

Figure 10:
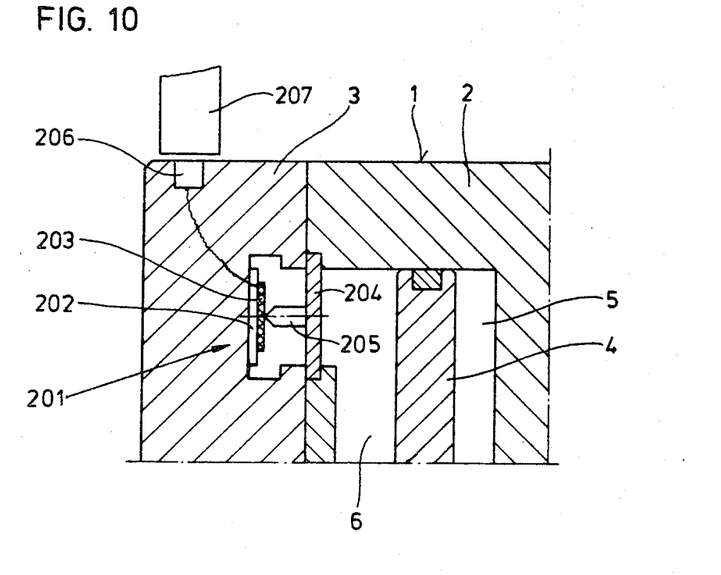
FIG. 10 shows the use of a piezoresistive element as a pulse generator in the chuck cylinder of FIG. 8.

According to FIG. 10, the pulse generator 201 is designed as a piezoresistive element 203 which is supported on an elastically deformable or prestressed foil 202 and delivers a current pulse upon being subjected to, or relieved from, pressure. The actuation of piezoresistive element 203 is effected through a pin 205 which is secured to a diaphragm 204 exposed to the pressure in pressure space 6.

Upon a significant pressure drop in space 6, piezoresistive element 203 is relieved or, with a prestressed foil, is stressed. This produces a current pulse which may be utilized through induction coils 206 and a switching element 207 associated therewith for controlling the working machine. The current pulse produced during the pressure rise in space 6 must, of course, be eliminated.

While specific embodiments of the invention have been shown and described in detail to illustrate the application of the principles of the invention, it will be understood that the invention may be embodied otherwise without departing from such principles.

What is claimed is:

1. In combination with a working machine of the type having a chuck body including a rotary chuck cylinder closed by a cylinder cover to define a substantially closed pressure space, and a chuck piston slidably disposed in the pressure space for displacement responsive to a fluid pressure in the pressure space, a source of fluid under pressure, and means for providing fluid communication between the source and the pressure space, an improved device for controlling the working machine, comprising: a pulse generator member axially guided within the chuck body in communication with the pressure space for movement responsive to the fluid pressure at a predetermined level and axially displaceable into an end position; switching means provided outside of the chuck body at a spaced location therefrom for switching the machine off; stop means connected to said pulse generator and engageable by the chuck piston near end position of the chuck piston so that said pulse generator is also responsive to chuck piston position; and a control member displaceably mounted in the chuck body operative to interconnect said pulse generator member and said switching means, whereby, the control member is displaceable upon movement of said pulse generator member into said end position to actuate said switching means to switch off the machine; said pulse generator member including piston means having a piston portion slidably guided in the cylinder cover operatively loaded by the fluid pressure in the pressure space and spring means for biasing said piston portion into an equilibrium position.

2. The improved combination as set forth in claim 1, wherein said piston portion includes a first piston, a second piston and a web portion interconnecting said first and second pistons.

3. The improved combination as set forth in claim 1, wherein the cylinder cover includes a recess in fluid communication with the pressure space and said pulse generator member is mounted in said recess.

4. The improved combination as set forth in claim 1, wherein said control member includes an elongated pin radially displaceable in said chuck body and operatively connected to said piston portion for movement in a direction other than that of the axial displacement of said pulse generator member.

5. The improved combination as set forth in claim 4, wherein said pin includes an oblique surface inclined in the direction of the displacement thereof and said piston portion includes an oblique portion contacting said first-mentioned oblique portion.

6. The improved combination as set forth in claim 4 further comprising a lever operatively connecting said pin to said piston portion.

7. The improved combination as set forth in claim 1, wherein said piston portion includes an extension projection through said cylinder cover at its side remote from the pressure space.

8. The improved combination as set forth in claim 1, wherein said piston means includes an extended portion connected to said piston portion, said extended portion extending into the pressure space for communication with the cylinder and carrying said stop means.

9. The improved combination as set forth in claim 1 wherein said piston portion comprises a double piston, a bushing mounted in the chuck cover for slidably receiving said double piston, said double piston defining a central chamber and having a first outer chamber communicating with the pressure space and a second outer chamber communicating with another space defined by the chuck piston in the chuck cylinder, said spring means comprising a spring in each of said first and second outer chamber, said double piston having in said central chamber a double inclined portion engaged with said control member.

10. The improved combination as set forth in claim 9, wherein said control member includes double inclined surfaces engaged with said double incline portion of said double piston and a pin engaging said double incline portion for movement of said control member with movement of said double piston in either a forward or rearward axial motion.

11. The improved combination as set forth in claim 1, wherein said switching means includes a non-contact switch, and a machine control electrically connected to said non-contact switch for switching off the machine.

* * * * *